United States Patent Office 3,238,454
Patented Mar. 1, 1966

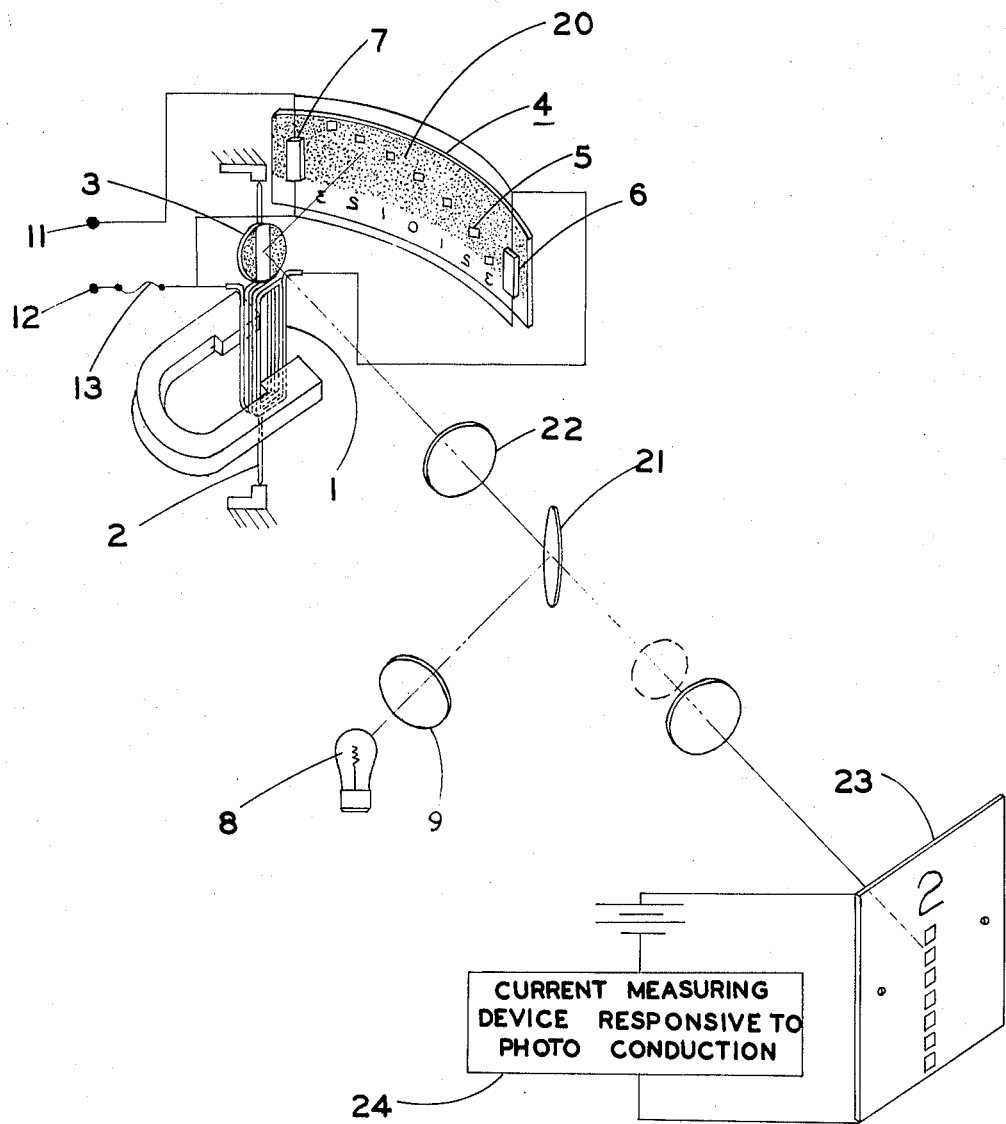

3,238,454
OVERLOAD PROTECTION CIRCUIT FOR MIRROR GALVANOMETER USING PHOTOCONDUCTIVE CELLS TO SHUNT OVERLOAD CURRENT
Alexander E. Martens, Greece, N.Y., assignor to Bausch & Lomb Incorporated, Rochester, N.Y., a corporation of New York
Filed Sept. 17, 1962, Ser. No. 223,993
4 Claims. (Cl. 324—110)

This invention relates to a measuring instrument and more particularly to a safety circuit for an instrument which measures a variable quantity through use of optical means.

The use of a measuring instrument for measuring a variable quantity through the use of a deflection of a light beam provides a very sensitive measuring device. Due to the extreme sensitivity of the device it is necessary that some means be used as a protection against overload of the device. The device covered under this invention uses a current sensing element rotatable on an axis carrying a mirror for deflecting a beam of light. The relative position of the beam of light on a scale provides a reading proportionate to the quantity of current flowing through the current sensing element. The quantity of current is extremely small which consequently requires that some protection means be included to prevent overload of the coil. Accordingly this invention is intended to provide photocells for protection of the coil on the extreme limits of deflection of the light beam which shunt the coil with a low impedance when illuminated.

It is an object of this invention to provide an overload circuit in combination with a measuring instrument.

It is another object of this invention to provide an overload protection circuit with a light beam deflecting element, and photocells activated by extreme deflection of the light beam create a low impedance to shunt the overload current and protect the coil.

It is a further object of this invention to provide light responsive variable impedance means in an optical measuring device shunting and protecting the current sensitizing element from overloads in current.

The objects of this invention are accomplished by placing photocells at the extreme positions in a current measuring scale having light sensitive elements. The photocells are connected in parallel with the deflection coil and in the normal operating position present high impedance to current flow causing the current to flow through the deflection coil. In event of reverse polarity or overload current the light beam is deflected to an extreme position on the scale causing the photocell impedance to drop and shunt the current around the coil thereby protecting the measuring instrument.

Other objects and advantages of the device will become apparent to those skilled in the art by reference to the description and drawings of which the preferred version is illustrated.

The drawings illustrate a measuring instrument with a deflecting means for a beam of light and the shunting circuit for overload protection.

Referring to the drawings the deflection coil 1 is pivotally mounted for rotation about an axis 2. The coil 1 supports a mirror 3 which deflects a light beam. A curved measuring scale 4 is mounted around the axis of rotation of the coil 1. The scale supports a plurality of reflecting surfaces 5 on a non-reflecting back 20. An example of a measuring instrument with which this overload circuit might be used is the copending application entitled "Optical Electrical System" of the same assignee, Serial No. 203,205 filed June 18, 1962, now Patent No. 3,144,807. The optical system associated with the copending application is similar to the system as illustrated in the drawings.

The scale as illustrated in the copending application however is modified in this disclosure to include a photoconductive cell at each of the two ends of the scale. The photoconductive cells 6 and 7 are electrically connected in parallel to the deflection coil 1.

A light source 8 projects a beam of light through the condenser lens 9 which directs the luminous flux onto the beam splitter 21 and lens 22 to the mirror 3. The mirror reflects the light into the scale 4. The light beam is reflected throuugh the optical system to the screen 23 which is electrically connected to a current measuring device 24.

The photoconductive elements illustrated on the screen 23 are electrically connected to the current measuring device. The change in the position of the mirror 3 about its axis produces a rotational change which is indicated by the particular reference surface 5 which is imaged on the mating photoconductive cell on the screen 23. Each photoconductive cell generates an electrical signal which is measured by the measuring device 24 indicating the magnitude of current flow through the coil 1. Reference may be had to the copending patent application for a description of a specific embodiment of the meter circuit described.

If the magnitude of the current through the coil 1 was excessive the coil 1 might burn out or become damaged. However, simultaneous with a large flow of current through the coil 1 a proportionate deflection is also present causing the beam of light to swing to an extreme position actuating the photocell 6 thereby reducing the impedance and shunting the current around the coil 1.

In event the terminals 11 and 12 were connected in reverse polarity a similar situation would arise causing the mirror to rotate to the opposite extreme position actuating the photocell 7 which in turn would shunt the current around the coil 1 preventing harm to the coil. If the excessive currents continue provision is provided for a fuse 13 connecting the input to the coil. The fuse would be an additional precaution for protection of the coil and the meter itself.

The overload protection circuit as illustrated is adapted for use with any type of a measuring instrument for measuring a variable quantity. The device as illustrated however operates on the principle of controlling the magnitude of current flowing through the coil 1 which in turn carries a mirror. A mirror type galvanometer as illustrated provides for extreme sensitivity to the flow of current to the coil. A small magnitude of current produces a large deflection of the light beam and provides a very sensitive reading in this type of an instrument. The use of the light beam assists in increasing the sensitivity of the measuring instrument, however with increased sensitivity the danger of an overload of current is also increased. With this type of an overload protection circuit this danger is substantially eliminated.

Various modifications might be devised which would fall within the scope of this invention of which the preferred embodiment is illustrated. It is understood that these embodiments are considered a part of this invention. The following claims define the scope of the invention.

I claim:

1. In an electrical measuring instrument for measuring and indicating a variable electrical value by deflecting a light beam, an overload circuit comprising, a current sensing element positioned for pivotal movement about an axis and pivoting through an angle of which the magnitude is responsive to the magnitude of current flowing through said element, reflecting means connected to said current sensing element for movement with said element, an arcuate scale means positioned in an arcuate manner relative to the axis for receiving reflected light from said reflecting means, a variable impedance photoconductive cell positioned on each of the ends of said scale means with each cell electrically connected in parallel with said current sensing element, means directing light on said reflecting means for reflecting light on said scale means, said reflecting means deflecting the light across said scale through the angle responsive to the magnitude of current flowing through said current sensing element as said reflecting means is rotated about the axis, said photoconductive cells providing a current shunting means around said current sensing element when light is incident on said photoconductive cells thereby protecting said current sensing element against overload of current.

2. In a current sensing instrument for measuring the magnitude of current flow by the rotation of the light deflecting means, an overload circuit comprising a current conducting coil positioned for pivotal movement about an axis, a reflecting means connected to said current conducting coil for movement with said coil, a scale means providing an indication of the magnitude of current flowing through said coil, a variable impedance photoconductive cell positioned on each end of said scale means with each cell electrically connected in parallel with said coil, means directing a light on said reflecting means for reflecting light on said scale and deflecting the light through an angle in response to the magnitude of current flow through said coil, said photoconductive cells receiving incident light when said reflecting means are rotated through a predetermined maximum angle to thereby reduce the impedance of said photoconductive cells and prevent overload current flowing through said coil.

3. A protection circuit for an electrical measuring instrument having an optical system comprising, a current sensing element supporting a light reflecting element pivotally positioned in a magnetic field and pivoting through an angle of which the magnitude is responsive to the magnitude of current flowing through said element, said reflecting element reflecting light within an angle of rotation of which the sides of said angle define the extreme limits of rotation of said reflecting element, photoconductive cell means electrically connected in parallel with said current sensing element and disposed on the extreme limits of rotation of said reflecting element, a current indicating scale arcuately disposed about the pivoting axis of said current sensing element receiving incident light from the reflecting element and supporting said photoconductive cells on its ends, said photoconductive cell means having a decreasing impedance characteristic in response to incident light thereby shunting current around said current sensing element when the light beam is deflected to either of the extreme limits of said scale.

4. A protection circuit for an electrical measuring instrument having an optical system comprising, a current sensing element supporting a light reflecting member pivotally positioned in a magnetic field and pivoting through an angle of which the magnitude is responsive to the magnitude of current flowing through said element, a graduated scale for receiving an incident beam of light from said reflecting member and indicating the magnitude of current flow through said current sensing element by the position of a reflected beam of light incident on said scale, photoconductive cell means electrically connected in parallel with said current sensing element and positioned on the ends of said scale, said photoconductive cell means decreasing its impedance in response to the incident light beam on the cell means at the ends of said scale to thereby shunt current around said current sensing element to limit the maximum current through said coil.

References Cited by the Examiner

UNITED STATES PATENTS

| | | | |
|---|---|---|---|
| 2,236,255 | 3/1941 | Young | 250—231 |
| 2,356,579 | 8/1944 | Gardner | 324—97 |
| 2,902,651 | 9/1959 | Friedrichs | 324—110 |
| 2,986,689 | 5/1961 | Kofer | 338—15 X |

FREDERICK M. STRADER, *Primary Examiner.*

RUDOLPH V. ROLINEC, *Examiner.*